United States Patent [19]

Rinehart

[11] Patent Number: 4,876,326
[45] Date of Patent: * Oct. 24, 1989

[54] SOLID STATE POLYMERIZATION OF POLYESTER PREPOLYMERS

[75] Inventor: Verne R. Rinehart, McArthur, Ohio

[73] Assignee: The Goodyear Tire & Rubber Company, Akron, Ohio

[*] Notice: The portion of the term of this patent subsequent to Jul. 5, 2005 has been disclaimed.

[21] Appl. No.: 161,312

[22] Filed: Mar. 11, 1988

Related U.S. Application Data

[63] Continuation-in-part of Ser. No. 30,319, Mar. 26, 1987, Pat. No. 4,755,587.

[51] Int. Cl.$^4$ .............................................. C08G 63/02
[52] U.S. Cl. .................................. 528/272; 528/308.1; 528/308.2; 528/308.5; 528/483; 528/502; 528/503
[58] Field of Search ................... 528/272, 380.1, 308.2, 528/308.5, 483, 502, 503

[56] References Cited

U.S. PATENT DOCUMENTS 3,586,647  6/1971  Kremer ............................ 260/2.5
4,327,205  4/1982  Kato et al. ........................ 528/128
4,374,975  2/1983  Duh .................................. 528/272

FOREIGN PATENT DOCUMENTS 2212768  3/1972  Fed. Rep. of Germany.

Primary Examiner—John Kight
Assistant Examiner—Samuel A. Acquah
Attorney, Agent, or Firm—Alvin T. Rockhill

[57] ABSTRACT

High molecular weight polyester resins such as polyethylene terephthalate, are sometimes produced from low molecular weight polyester prepolymers having the same composition by solid state polymerization. The low molecular weight polyester prepolymers which are used in such solid state polymerizations are normally prepared by conventional melt polymerizations and are generally in the form of pellets or chips. It has been unexpectedly found that solid state polymerization rates can be greatly improved by utilizing polyester prepolymers which are in the form of porous pills. By utilizing polyester prepolymers that are in the form of porous pills, higher molecular weights can be achieved after shorter solid state polymerization times.

24 Claims, No Drawings

SOLID STATE POLYMERIZATION OF POLYESTER PREPOLYMERS

This is a continuation-in-part of application Ser. No. 030,319, filed on Mar. 26, 1987 (now issued as U.S. Pat. No. 4,755,587)

BACKGROUND OF THE INVENTION

High molecular weight polyesters are commonly produced from low molecular weight polyesters of the same composition by solid state polymerization. The low molecular weight polyesters which are used in such solid state polymerizations can be prepared by conventional melt polymerizations. Solid state polymerization is generally considered advantageous in that the handling of high molecular weight ultra-high viscosity molten polymers is eliminated during the solid state polymerization phase. Thermal degradation during the solid state portion of the polymerization is also essentially avoided.

In melt polymerizations, the major part of the reaction is transesterification due to the fact that thermal pyrolysis nullifies much of the esterification of carboxyl end groups. A much larger percentage of the reaction in a solid state polymerization is esterification. Thus, a high molecular weight can be obtained in a solid state polymerization with a lower carboxyl concentration than can be achieved in a melt polymerization.

The low molecular weight polyester prepolymers utilized in solid state polymerizations are generally in the form of pellets, chips, or finely divided powder. Such pellets can vary greatly in size: however, as a general rule, the smaller the size of the pellets of polyester prepolymer the faster the solid state polymerization with proceed. Such polyester prepolymers are generally converted from the amorphous to the crystalline state prior to solid state polymerization in order to raise their sticking temperature. This is done in order to keep the pellets or chips of polyester prepolymer from sticking together as a solid mass in the solid state polymerization reactor.

In the solid state polymerization of a polyester prepolymer the polymerization is carried out at an elevated temperature which is below the melting point of the polyester resin. Such polymerizations are normally conducted in the presence of a stream of inert gas or under a vacuum. Solid state polymerizations are normally conducted on a commercial basis in the presence of a stream of inert gas since it serves to remove volatile reaction products and helps to heat the polyester.

Heretofore, the form of the polyester prepolymer has essentially dictated the type of solid state polymerization process which could be employed in order to convert the low molecular weight polyester prepolymer into high molecular weight polyester resin. For example, it has generally been accepted practice to use polyester prepolymer in the form of pellets or chips in vacuum and static bed processes and finely ground powder in fluidized bed processes. The reason for this is that experience has shown that finely ground powders tend to agglomerate in vacuum processes, resulting in slower polymerization rates and a need to regrind the high molecular weight polyester resin produced. Experience has also shown that, in static bed processes finely ground powders will channel or fissure, resulting in uneven polymerization and prolonged polymerization rate. On the other hand, the use of pellets or chips in fluidized bed processes is not economically feasible in view of the velocity and volume of inert gas needed to suspend the pellets or chips and the size of the equipment required to do so.

Polyester prepolymers which are in the form of finely divided powders solid state polymerize at faster rates than do polyester prepolymers which are in the form of pellets or chips. However, polyester prepolymers which are in powder form are difficult to handle and generally must be polymerized in fluidized bed processes. Additionally, the high molecular weight polyester resins which are made utilizing prepolymers which are in powder form are also in the form of powders which are more difficult to process into articles of manufacture. For these reasons polyester prepolymers in powder form have not been widely utilized in commercial solid state polymerization techniques.

SUMMARY OF THE INVENTION

It has been unexpectedly found that polyester prepolymers in the form of porous pills can be solid state polymerized at very fast polymerization rates with the high molecular weight polymer produced having a very narrow molecular weight distribution. In fact, polyester prepolymers in the form of porous pills can be solid state polymerized at a rate which is essentially equivalent to the rate at which powdered prepolymers can be solid state polymerized. Such polyester prepolymers in the form of porous pills can be solid state polymerized in virtually any type of reaction zone, such as a static bed or a fluidized bed.

The resultant high molecular weight polyester resin produced can be processed in conventional equipment which is designed to accept standard pellets or chips of the high molecular weight polyester resin. By utilizing the solid state polymerization technique of this invention, essentially all of the advantages associated with using pellets or chips are realized without being subjected to slow polymerization rates.

The subject invention specifically discloses an improved process for solid state polymerizing a polyester prepolymer into a high molecular weight polyester resin comprising heating the polyester prepolymer to a temperature which is within the range of about 50° C. below its sticking temperature up to its sticking temperature, wherein the polyester prepolymer is in the form of porous pills.

The present invention more specifically reveals in a solid state process for polymerizing low molecular weight polyester prepolymer to high molecular weight polyester resin, the improvement which comprises the use in said process of polyester prepolymer having an intrinsic viscosity of less than 0.3 dl/g as measured in a 60/40 phenol/tetrachloroethane solvent system at 30° C., wherein said polyester prepolymer is in the form of discrete porous pills which have a density within the range of about 70% to about 99% of the density of solid polyester pellets which are comprised of said low molecular weight polyester prepolymer and wherein said porous pills weight from about 0.0005 to about 0.5 grams.

The subject invention also discloses in a process for solid state polymerizing a polyester prepolymer into a high molecular weight polyester resin at an elevated temperature, the improvement which comprises utilizing a polyester prepolymer which is in the form of porous pills and which weigh-from about 0.0005 to about 0.5 grams. This invention is particularly useful in solid state polymerizing polyethylene terephthalate in the form of porous pills having a density within the range of about 1.1 to about 1.3 grams per cubic centimeter.

This invention further reveals a porous pill which can be solid state polymerized at a very rapid rate into a high molecular weight polyester resin wherein said porous pill is comprised of a polyester prepolymer having an intrinsic viscosity of at least about 0.1 dl/g in a 60:40 phenol:tetrachloroethane solvent system at a temperature of 30° C. and at a concentration of 0.4 g/dl; wherein said porous pill contains a substantial volume of interstices which penetrates the porous pill and opens to the outside: and wherein the porous pill has a density which is within the range of about 70% to about 99% of the density of solid polyester pellets which are comprised of the same polyester prepolymer.

DETAILED DESCRIPTION OF THE INVENTION

This invention is applicable to virtually any polyester which can be solid state polymerized. The most common type of polyesters which will be solid state polymerized using the technique of this invention will have at least about 75 mole percent of their acid moieties being provided by an aromatic dicarboxylic acid, such as terephthalic acid, isophthalic acid, or a naphthalinic dicarboxylic acid (preferably 2,6-) with their diol moieties being provided by glycols such as ethylene glycol, butylene glycol, 1,4-dimethylol cyclohexane and the like or aromatic diols such as hydroquinone and catechol. Such polyesters can also contain other dicarboxylic acids such as adipic acid, isophthalic acid, sebacic acid, and the like. Polyethylene terephthalate (PET), polyethylene isophthalate, polyethylene naphthalate, and polybutylene terephthalate homopolymers are some representative examples of such polyesters that can be solid state polymerized to high molecular weights. Blends of various polyesters can also be polymerized using the process of this invention. For instance, it can be utilized in solid state polymerizing melt blends of polyethylene terephthalate and polyethylene isophthalate. Such blends of polyethylene terephthalate and polyethylene isophthalate have excellent gas barrier properties and are very useful in making packaging materials, such as beverage bottles (see U.S. Pat. No. 4,551,368).

The polyester prepolymers (starting polyesters) utilized in this invention can be made in any manner but are typically prepared by conventional melt polymerization techniques. Thus, conventional temperatures, catalysts, amounts of catalysts, stabilizers, and the like, are utilized in manners well known in the literature and art in making the polyester prepolymer. These polyester prepolymers have an initial starting IV (intrinsic viscosity) of at least about 0.1 dl/g in a 60:40 phenol:tetrachloroethane solvent system at a temperature of 30° C. and at a concentration of 0.4 g/dl. The polyester prepolymers which are solid state polymerized in accordance with this invention will generally have an original or starting IV of from about 0.15 to about 0.7 dl/g. In order to maximize the benefits of the subject invention, the polyester prepolymers will normally have a starting IV of less than 0.3 dl/g. Preferably, the polyester prepolymer used will have a starting IV of 0.18 to 0.29 dl/g. More preferably, such polyester prepolymers will have an original IV within the range of 0.2 to 0.28 dl/g. Virtually any type of polyester prepolymer can be solid state polymerized using the technique of this invention. Such polyester prepolymers are comprised of one or more diacid components and one or more diol components.

The diacid component in the polyesters to which this invention pertains are normally alkyl dicarboxylic acids which contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain from 9 to 22 carbon atoms, or diesters of alkyl substituted aryl dicarboxylic acids which contain from 11 to 22 carbon atoms. The preferred alkyl dicarboxylic acids will contain from 4 to 12 carbon atoms. Some representative examples of such alkyl dicarboxylic acids include glutaric acid, adipic acid, pimelic acid, and the like. The preferred diesters of alkyl dicarboxylic acids will contain from 6 to 12 carbon atoms. A representative example of such a diester of an alkyl dicarboxylic acid is azelaic acid. The preferred aryl dicarboxylic acids contain from 8 to 16 carbon atoms. Some representative examples of aryl dicarboxylic acids are terephthalic acid, isophthalic acid, and orthophthalic acid. The preferred diesters of aryl dicarboxylic acids contain from 10 to 18 carbon atoms. Some representative examples of diesters of aryl dicarboxylic acids include diethyl terephthalate, diethyl isophthalate, diethyl orthophthalate, dimethyl naphthalate, diethyl naphthalate and the like. The preferred alkyl substituted aryl dicarboxylic acids contain from 9 to 16 carbon atoms and the preferred diesters of alkyl substituted aryl dicarboxylic acids contain from 11 to 15 carbon atoms.

The diol component utilized in preparing the polyester prepolymers used in the process of this invention is normally comprised of glycols containing from 2 to 12 carbon atoms, glycol ethers containing from 4 to 12 carbon atoms, and polyether glycols having the structural formula $HO(A-O)_nH$ wherein A is an alkylene group containing from 2 to 6 carbon atoms and wherein n is an integer from 2 to 400. Generally, such polyether glycols will have a molecular weight of 400 to about 4000.

Preferred glycols normally contain from 2 to 8 carbon atoms with preferred glycol ethers containing from 4 to 8 carbon atoms. Some representative examples of glycols that can be utilized as the diol component include ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, 2,2,4,4-tetramethyl-1,3-cyclobutane diol, and the like. Some representative examples of polyether glycols that can be used include polytetramethylene glycol (Polymeg TM) and polyethylene glycol (Carbowax TM).

Branched polyester prepolymers can also be solid state polymerized in accordance with the process of the present invention. Such branched polyesters normally contain branching agents which contain three or more functional groups and preferably contain three or four functional groups. Such reactive functional groups can be carboxyl groups or aliphatic hydroxyl groups. The branching agent utilized in such branched polyesters can optionally contain both carboxyl groups and hydroxyl groups. Examples of acidic branching agents include trimesic acid, trimellitic acid, pyromellitic acid, butane tetracarboxylic acid, naphthalene tricarboxylic acids, cyclohexane-1,3,5-tricarboxylic acids, and the like. Some representative examples of hydroxyl branching agents (polyols) include glycerin, trimethylol propane, pentaerythritol, dipentaerythritol, 1,2,6-hexane triol, and 1,3,5-trimethylol benzene. Generally, from 0 to 3 percent of a polyol containing from 3 to 12 carbon atoms will be used as the branching agent (based upon the total diol component).

High strength polyesters which utilize at least one bis-hydroxyalkyl pyromellitic diimide in their diol component can also be solid state polymerized in the form of porous pills. The diol component in such high strength polyesters will normally contain from 5 to 50 mole percent of one or more bis-hydroxyalkyl pyromellitic diimides and will preferably be comprised of from 10 to 25 mole percent of at least one bis-hydroxyalkyl pyromellitic diimide. The remaining portion of the diol component in such high strength polyesters is comprised of additional copolymerizable diols. Such high strength polyesters are described in greater detail in U.S. Pat. No. 4,605,728, which is incorporated herein by reference in its entirety.

In accordance with the present invention, the low molecular weight polyester prepolymer is ground or spray congealed into a fine powder of about 20 mesh (less than 841 microns) or finer. For instance, it is desirable to grind the polyester prepolymer into a powder having a particle size of 40 mesh (less than 420 microns), 60 mesh (less than 250 microns), 140 mesh (105 microns) or even finer. In most cases, it will be appropriate to grind the polyester prepolymer to a particle size within the range of about 40 mesh (less than 420 microns) to about 60 mesh (less than 250 microns). However, smaller particle sizes within the range of 80 mesh (less than 177 microns) to 140 mesh (less than 105 microns) will normally result in stronger porous pills without decreasing solid state polymerization rates. For purposes of this invention, the term "particle size" means that a powder of the designated particle size will pass through a screen of the designated sized notwithstanding the fact that some of the particles may be larger than the designated particle size in some dimensions. For example, a powder having a particle size of less than 841 microns will pass through a 20 mesh screen even though some of the particles in the powder may be longer than 841 microns in some dimensions. Porous pills can then be made utilizing such powders of the polyester prepolymer.

The porous pills can be made by simply compacting the powder of the polyester prepolymer or by utilizing other appropriate means for agglomerating the powder into porous pills. For example, porous pills which are suitable for use in the process of this invention can be made by simply compacting the powder utilizing a high pressure of at least about one ton per square inch ($1.379 \times 10^7$ Pascals). Pressures within the range of about 1 to about 40 tons per square inch ($1.379 \times 10^7$ to $5.516 \times 10^8$ Pascals) are appropriate for compacting the powder into porous pills. It is, of course, also possible to utilize even high pressures in forming the porous pills. Porous pills can be made in this manner utilizing tablet presses which are similar to those used in the pharmaceutical industry. The temperature at which the porous pills are prepared by compaction is not critical. However, in most cases the porous pills will be prepared by compaction at a temperature within the range of about $-20°$ C. to about $150°$ C. with temperatures of $10°$ C. to $50°$ C. being more common. It is appropriate to prepare the porous pills by compaction at room temperature, simply for convenience.

Porous pills can be made utilizing compaction/granulation systems. In such a technique, the powder of polyester prepolymer is compacted between compaction rolls into a sheet which is subsequently granulated into porous pills which are in the form of granules. In a similar technique, porous pills can be made utilizing briquetting systems. In such briquetting systems, the powder of polyester prepolymer is compacted between compaction rolls into porous pills in the form of briquettes.

Extrusion equipment can also be used in making porous pills by compaction. In this technique the powder of polyester prepolymer is forced through a die by a screw, rollers or other means without melting the powder. The strands extruded through the die are then cut to the desired length to form porous pills.

Agglomeration techniques can also be used in making porous pills. For example, the powder of polyester prepolymer can be heated to soften its surface and agglomerate the powder into porous pills. In such a technique the powder is heated by the friction of two different plates which are moving over the powder in different directions or at different speeds. It is important to avoid excessive heat build-up which can destroy the porous nature of the porous pills being made.

A binder material can be used in agglomerating the powder into porous pills. The binder material used will be capable of sticking the powder together at a very low concentration. However, the binder will be compatible with the end use for which the high molecular weight polyester resin being made is intended. For example, the use of binders such as starch can result in color formation which is not desirable in high molecular weight polyester resin which is intended for use in making clear beverage bottles.

In an alternative embodiment of this invention, the porous pills are made by compacting fine fibers into the form of porous pills. Standard spinning techniques can be utilized in making such fine fibers. It is generally beneficial to cut the fibers into relatively short strands before compacting them into porous pills.

Satisfactory porous pills of virtually any size or shape can be prepared. However, the porous pills will normally weigh from about 0.0005 grams to about 0.5 grams. The preferred weight for the porous pills will depend upon the method by which they are manufactured. This is because some manufacturing techniques are very appropriate for making large porous pills with others being more suitable for making small porous pills. For example, porous pills which are made on a tablet press preferably weigh from about 0.03 grams to about 0.2 grams and more preferably weigh from 0.05 grams to 0.1 grams. Porous pills which are made utilizing a compaction/granulation process will preferably weigh from about 0.001 grams to about 0.1 grams and will more preferably weigh from about 0.005 grams to about 0.015 grams. The porous pills made can have virtually any shape. For instance, the porous pills can be in the form of cubes, cylinders, discs, spheres, rods, briquettes, or granules. It is desirable to prepare porous pills which are cylindrical or disc shaped in cases where the porous pills are made on a tablet press. This is because cylinders and discs can be easily prepared utilizing tablet presses and have good structural integrity. Irregular shaped granules can be easily made and are preferred in cases where the porous pills are made by a compaction/granulation process.

It is highly desirable for the polyester prepolymers utilized in making the porous pills to be in the crystalline state. In many cases, polyester prepolymers having an IV of less than 0.3 dl/g will crystallize upon solidification without the necessity of utilizing a separate crystallization step. In such cases, polyester prepolymers having an IV of less than 0.3 dl/g will inherently have the degree of crystallinity required for utilization in making porous pills. However, it is generally necessary to crystallize polyester prepolymers having an IV of over about 0.3 dl/g in a separate crystallization step. Such a crystallization step can be carried out at any time prior to the point at which the powdered polyester prepolymer is compacted or agglomerated into the porous pills. In other words, such a crystallization step can be done either before or after the polyester prepolymer is in powder form. Thus, the polyester prepolymer can be crystallized and subsequently converted to powder form or it can be converted to powder form and subsequently crystallized. Such a separate crystallization step can be comprised of virtually any suitable means for increasing the crystallinity of the polyester prepolymer, such as a thermal treatment step.

The density of the porous pills utilized in accordance with the process of this invention is naturally lower than the density of pellets or chips which are comprised of the same polyester having the same crystallinity. For instance, solid pellets which are comprised of polyethylene terephthalate prepolymer have a density that ranges from about 1.33 grams per cubic centimeter at a crystallinity of 0% to a density of about 1.46 grams per cubic centimeter at a crystallinity of 100%. Porous pills which are comprised of polyethylene terephthalate prepolymer typically have a density within the range of 1.0 to 1.3 grams per cubic centimeter at a crystallinity of 25%. Standard polyethylene terephthalate chips have a density of about 1.36 grams per cubic centimeter at a crystallinity of 25%. The porous pills of this invention have a density which is within the range of about 70% to about 99%. In most cases porous pills which are comprised of a given polyester prepolymer will have a density within the range of 70% to 96% of the density of solid polyester pellets which are comprised of the same polyester prepolymer. It is generally preferred for such porous pills to have a density of 85% to 93% of the density of solid polyester pellets which are comprised of the same polyester prepolymer. The porous pills of this invention have lower densities because they contain a significant amount of void space. The void space in the porous pills of this invention is comprised of a substantial amount of open pores or cavities which penetrate the pills. These cavities form passage ways through which water, glycols, acetaldehyde, and other reaction by-products which are formed in the solid state polymerization can more readily escape from the inner most portions of the porous pills. In other words, the porous pills contain a substantial volume of interstices which penetrate the porous pills and open to the outside.

The polyester prepolymer in the porous pills can optionally be converted to a higher degree of crystallinity prior to solid state polymerization in order to raise the sticking temperature of the porous pills. This is done in order to reduce the possibility of the porous pills sticking together as a solid mass in the solid state polymerization zone. Preferably, the surfaces of the polyester pills being solid state polymerized will have a crystallinity of at least about 20%. Porous pills have less tendency to stick together if their surface is crystallized even though they may be composed of amorphous polyester on the inside. Increased crystallinity can be achieved by any suitable treatment, such as by controlled heating of the porous pills or by treating the porous pills with the vapor of a suitable organic solvent.

The sticking temperature of crystalline or partially crystalline polyethylene terephthalate prepolymers is about 230° C. which is much higher than their sticking temperature in the amorphous state which is about 100° C. to 150° C. Polyester prepolymers are commonly crystallized to a crystallinity of at least about 20% prior to solid state polymerization. Typically, a polyester prepolymer can be converted to about 20% to 40% crystallinity by heating at 150° C. for 5 minutes to 300 minutes. At lower crystallization temperatures, longer heating times are normally required. Suitable time-temperature relationships can be easily determined by persons having skill in the art.

The amount of time required to crystallize the surfaces of porous pills by vapor treatment will vary with the concentration of the vapor, with the type of volatile organic compound being utilized, with the type of polyester prepolymer being utilized and with the crystallinity desired. Since vapor treatment crystallizes the porous pills from their surface inward, generally a lower degree of crystallinity is required to prevent porous pills made out of the polyester prepolymer from sticking than is required when the porous pills are crystallized utilizing a thermal treatment. This increased degree of crystallization in the porous pills is attained by simply exposing the porous pills to the vapors of a suitable organic compound, such as a volatile chlorinated hydrocarbon, a volatile ketone, tetrahydrofuran, ethylene oxide, or propylene oxide. Methylene chloride and acetone are particularly preferred volatile organic compounds for utilization in such vapor crystallizations.

The porous pills can also be crystallized in a high frequency energy field ranging from about 20 megahertz to about 300 megahertz. Such a technique is described in greater detail in U.S. Pat. No. 4,254,253, which is incorporated herein by reference in its entirety.

Porous pills which are comprised of polyester prepolymers can be solid state polymerized in accordance with the process of this invention in a batch or continuous process. Suitable solid state polymerization temperatures can range from a temperature just above the threshold temperature of the polymerization reaction up to a temperature within a few degrees of the sticking temperature of the porous pills which can be well below their melting point For instance, the sticking temperature of crystalline or partially crystalline polyethylene terephthalate prepolymers is about 240° C. which is much higher than their sticking temperature in the amorphous state which is typically about 100° C. to 150° C.

The solid state polymerizations of this invention are generally conducted at a temperature which is within the range of about 50° C. below the sticking temperature of the polyester prepolymer up to but not including the sticking temperature of the polyester prepolymer. The solid state polymerization temperature utilized will typically be from about 1° C. to about 50° C. below the sticking temperature of the porous pills which are comprised of polyester prepolymer The optimum solid state reaction temperature will differ somewhat for prepolymers of different compositions and of different molecular weights. As a general rule, the optimum solid state polymerization temperature for porous pills will be from about 5° C. to about 20° C. below their sticking temperature. For example, in the solid state polymerization of porous pills comprised of polyethylene terephthalate, the highest temperatures which can normally be employed range from 240° C. to about 255° C. which is just below the sticking temperature and melting point of this polyester. Generally, the polyethylene terephthalate will be solid state polymerized at a temperature of from about 210° C. to about 255° C. In most cases polyethylene terephthalate will be solid state polymerized at a temperature of from 230° C. to 250° C.

As the solid state polymerizatron of a polyester prepolymer proceeds, its sticking temperature can increase. Thus, the solid state polymerization temperature can be incrementally increased during the course of the polymerization. For example, in the case of polyethylene terephthalate the process described in U.S. Pat. No. 3,718,621, which is incorporated herein by reference in its entirety, can be utilized.

The solid state polymerization is conducted under a vacuum or in the presence of a stream of an inert gas. Normally such solid state polymerizations are conducted in the presence of an inert gas stream. It is highly desirable for the inert gas to flow uniformly throughout the solid state polymerization zone which is filled with porous pills which are comprised of polyester prepolymer which is being polymerized. In order to help insure that the inert gas flows homogeneously or uniformly through the solid state polymerization zone without bypassing certain areas in it, a device for dispersing the inert gas is generally used. Thus, a good polymerization reactor will be designed in such a way that the inert gas will flow homogeneously through the porous pills in it. It should be noted that most of the inert gas flows around the porous pills of polyester prepolymer as it streams through the solid state polymerization zone.

Some suitable inert gases for use in the solid state polymerization process of this invention include nitrogen, carbon dioxide, helium, argon, neon, krypton, xenon, and certain industrial waste gases. Various combinations or mixtures of different inert gases can also be used. In most cases nitrogen will be used as the inert gas.

The total amount of inert gas needed to solid state polymerize a polyester prepolymer into a high molecular weight polyester resin in a given solid state polymerization reactor at a given temperature can be greatly reduced by pulsing the inert gas through the polyester prepolymer. The minimum amount of inert gas that needs to be pulsed through a given polyester prepolymer per unit time per unit weight will vary with the polyester, the solid state polymerization temperature used, and the design of the polymerization reactor. The optimum manner of pulsing the inert gas through the porous pills will also vary with the type of polyester used, the polymerization temperature used, and the design and size of the polymerization reactor. Usually, between about 0.05 and about 2 liters of inert gas per hour will be pulsed through the polyester prepolymer per kilogram of the polyester prepolymer. Generally the best way to pulse the inert gas through the polyester prepolymer being solid state polymerized is to repeatedly turn the flow of inert gas on and off. U.S. Pat. No. 4,532,319, which is incorporated herein by reference in its entirely describes this technique for reducing the consumption of inert gas in greater detail.

The solid state polymerization zone can be of virtually any design that will allow the polyester prepolymer to be maintained at the desired solid state polymerization temperature for the desired residence time and which allows for removal of reaction by-products, such as acetaldehyde. Such solid state polymerization zones can be reactors which have a fixed bed, a static bed, a fluidized bed, or a moving bed. In most cases, it is preferred to utilize a tubular polymerization reactor wherein the porous pills flow through the reactor for the desired residence time. Such tubular reactors have a substantially uniform cross-section and a sufficient height to allow the porous pills to flow by reason of the force of gravity from the top to the bottom of the reactor in the desired residence time. In other words, the porous pills move from the top to the bottom of such a tubular polymerization reactor in a partially dammed state. The rate of flow through such a reactor can be controlled by regulating discharge at the bottom of the reactor. It is generally preferred to allow an inert gas to flow countercurrently (upwardly) through the reactor at a gas velocity well below the turbulence point so that the porous pills are not fluidized (always remain in contact with each other). The porous pills remain in substantially the same physical form throughout the solid state polymerization process.

The polyester prepolymer will be solid state polymerized for a time sufficient to increase its molecular weight or IV to that of the high molecular weight polyester resin desired. It will be desirable for the high molecular weight polyester resin being prepared to have an IV of at least 0.65 dl/g. In most cases the high molecular weight resin will have an IV of at least 0.7 dl/g and for many applications will preferably have an IV of at least about 1.0 dl/g. Polyester resins having an IV of greater than 2.0 dl/g are useful in some application and can be made by using the process of this invention. For example, polyethylene terephthalate resin having an IV of greater than 2.3 dl/g can be made by utilizing this invention. In fact, high molecular weight polyethylene terephthalate resins having an IV of greater than 2.0 dl/g can be made in a solid state polymerization time of less than 5 hours starting with a prepolymer having an IV of less than 0.5 dl/g.

The polymerization time required to increase the molecular weight of the polyester prepolymer to a given desired molecular weight will, of course, vary with the polymerization temperature used, the IV of the polyester prepolymer utilized, and with the final IV desired. Very long polymerization times can be utilized if ultra-high molecular weight polyester resins are desired. However, polyesters having very high molecular weights and IV's in excess of 2.0 can normally be prepared utilizing polymerization times of less than 12 hours. In most cases the polymerization times utilized in carrying out the process of this invention will range from about 30 minutes to about 24 hours. In making polyethylene terephthalate resin having an IV within the range of 0.65 dl/g to 0.85 dl/g from a prepolymer having an IV of less than 0.3 dl/g, it will be preferred to utilize a polymerization time ranging between about 1 hour and about 12 hours. Such solid state polymerizations can, of course, be carried out utilizing batch, semi-continuous, or continuous techniques. In the case of continuous solid state polymerizations, the polymerization times referred to are residence times in the solid state polymerization reaction zone.

The rate at which porous pills made from polyethylene terephthalate prepolymer can be solid state polymerized will also depend upon the carboxyl end group content of the prepolymer. As a general rule, polyethylene terephthalate prepolymers having a minimal carboxyl content achieve a maximum solid state polymerization rate in the polymerizations of this invention. Thus, for maximum solid state polymerization rates a polyethylene terephthalate prepolymer having a carboxyl and group content of less than about 30% and preferable less than about 20% can be used. However, in some cases it will not be desirable to use polyethylene terephthalate prepolymers with such low carboxyl contents because high molecular weight resins having low carboxyl contents are not desirable in some applications. In such cases polyethylene terephthalate prepolymer having higher carboxyl end group contents can, of course, be used.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

Polyethylene terephthalate having an IV of 0.339 was prepared utilizing a conventional melt polymerization technique. The polyethylene terephthalate prepolymer was ground to a 20 mesh particle size (less than 841 microns). The powder made was then crystallized in an oven at a temperature of about 180° C. A 0.1875 inch (4.8 mm) diameter press was then utilized to compact the crystallized powder into porous pills which weighed about 0.06 grams which were in the shape of cylinders having a diameter of 0.1875 inches (4.8 mm) and a height of 0.1875 inches (4.8 mm). A pressure of 3,000 lbs. per square inch ($2.068 \times 10^7$ Pascals) was utilized in making the porous pills.

The porous pills were dried at a temperature of about 170° C. for 1 hour. A laboratory size solid state polymerization reactor, equipped with a sintered glass dispersing plate, was then utilized in solid state polymerizing the porous pills which were made. The porous pills were put into the reactor and the reactor was placed in a constant temperature bath which was maintained at about 250° C. A preheated nitrogen stream was allowed to flow through the solid state polymerization reactor at a constant flow rate of about 8 standard cubic feet (0.23 m$^3$) per hour. The polyethylene terephthalate prepolymer was allowed to solid state polymerize for about 5 hours. The high molecular weight polyethylene terephthalate resin produced by this process was determined to have an IV of 2.389 dl/g. This example clearly shows that the process of this invention can be used to prepare polyester resins having very high molecular weights from polyester prepolymers having very low molecular weights while utilizing relatively short polymerization times. The process of this invention can be utilized to greatly increase the through put of a given solid state polymerization reactor. Accordingly, the process of this invention greatly reduces the energy requirements required in order to increase the IV of a polyester prepolymer to a given higher IV which is desired.

EXAMPLE 2

The procedure described in Example 1 was utilized in this experiment except that the polyester prepolymer had an initial IV of 0.59 dl/g, the constant temperature bath was maintained at about 227° C., and the polymerization time was 2.5 hours. The resin produced in this experiment was determined to have an IV of 1.04 dl/g.

COMPARATIVE EXAMPLE 3

This comparative experiment deals with the solid state polymerization of standard chips or pellets which are comprised of polyethylene terephthalate. In this experiment the procedure described in Example 2 was utilized except that the polyester prepolymer was in the form of solid chips, the constant temperature bath was maintained at 230° C., the nitrogen flow rate was 4 standard cubic feet (0.11 m$^3$) per hour, and the polymerization time was about 5 hours. In this experiment the polyethylene terephthalate resin produced was determined to have an IV of about 0.90 dl/g.

Even though the polyester prepolymer in this experiment was allowed to solid state polymerize for twice as long as it was in Example 2 at a slightly higher temperature, the polyester resin produce had a much lower IV. This comparative example clearly shows that the utilization of porous pills results in a much faster rate of solid state polymerization than is attained when standard pellets or chips of the polyester prepolymer are utilized.

EXAMPLE 4

The procedure described in Example 1 was utilized in this experiment except that the constant temperature bath was maintained at about 227° C. and the polymerization was conducted for a period of 6 hours. In this experiment the polyethylene terephthalate resin produced by solid state polymerization was determined to have an IV of 1.04 dl/g. This experiment, again, shows that the process of this invention can be used in order to solid state polymerize polyester prepolymers having a very low IV into high molecular weight resins having a high IV.

EXAMPLE 5

Polyethylene terephthalate having an IV of 0.259 dl/g was synthesized utilizing a conventional melt polymerization technique and ground to a powder having a particle size of 20 mesh (less than 841 microns). The powder was compressed into porous pills which weighed about 0.05 g utilizing a pressure of 3000 pounds per square inch ($2.068 \times 10^7$ Pascals). The porous pills were then placed in the laboratory size solid state polymerization reactor described in Example 1 which was heated to a temperature of 345° F. (174° C.) for a drying period of about one hour. The dry porous pills were determined to have an IV of about 0.27 dl/g.

The prepolymer was then solid state polymerized at a temperature of 440° F. (227° C.) at a constant nitrogen flow rate of 12 standard cubic feet (0.35 m$^3$) per hour. The IV of the polyethylene terephthalate was determined after the approximate polymerization times reported in Table I.

TABLE I

| Polymerization Time (Hours) | IV (dl/g) |
|---|---|
| 1 | 0.412 |

TABLE I-continued

| Polymerization Time (Hours) | IV (dl/g) |
| --- | --- |
| 2½ | 0.516 |
| 4¾ | 0.624 |
| 7½ | 0.737 |

This example shows that polyesters having very low IV's of less than 0.28 can be solid state polymerized utilizing the technique of this invention. It also shows that high IV's of greater than 0.70 which are required in polyester resins which are used in carbonated beverage bottles can be made in short polymerization times.

EXAMPLE 6

The procedure described in Example 5 was used in this experiment except that the polyethylene terephthalate prepolymer was ground to a particle size of 60 mesh (less than 250 microns). The IV of the polymer made was determined after the approximate polymerization times reported in Table II.

TABLE II

| Polymerization Time (Hours) | IV (dl/g) |
| --- | --- |
| 1 | 0.417 |
| 2½ | 0.582 |
| 4¾ | 0.679 |
| 7½ | 0.779 |

EXAMPLE 7

Polyethylene terephthalate having an IV of 0.258 dl/g was synthesized utilizing a conventional melt polymerization technique and was ground to a powder having a particle size of 80 mesh (less than 177 microns). The powder was then made into porous pills utilizing a commercial compaction/granulation system (the Chilsonator ®/granulator process for the densification and granulation of powders). In the process used, the powder was compacted into a sheet between compaction rolls with the pressure applied being regulated by hydraulic actuators. The sheet was then broken in a "pre-break stage" into chips and flakes which were subsequently granulated to the desired size (the porous pills made had an average weight of about 0.039 g). The porous pills were then placed in the laboratory size solid state polymerization reactor described in Example 1 which was heated to a temperature of 180° C. for a drying period of about one hour.

The prepolymer was then solid state polymerized at a temperature of 235° C. at a constant nitrogen flow rate of 12 standard cubic feet (0.35 m$^3$) per hour. The IV of the polyethylene terephthalate was determined after the approximate solid state polymerization times reported in Table III.

TABLE III

| Polymerization Time (Hours) | IV (dl/g) |
| --- | --- |
| 2 | 0.558 |
| 4 | 0.718 |
| 6 | 0.807 |
| 8 | 0.916 |

This example shows that satisfactory porous pills can be made using a commercial compaction/granulation system. It also shows that polyester prepolymers having very low IV's of less than 0.3 dl/g can be made into porous pills by compaction/granulation systems and that such porous pills can be solid state polymerized to an IV of greater than 0.7 dl/g in only about 4 hours. It also shows that a polyester prepolymer having an IV of less than 0.3 dl/g can be solid state polymerized to a high molecular weight polyester resin having an IV of greater than 0.9 dl/g in a polymerization of only about 8 hours.

EXAMPLE 8

The procedure described in Example 7 was utilized in this experiment except that the porous pills were granulated to an average weight of about 0.014 g. The IV of the polyester made was determined after the approximate polymerization times reported in Table IV.

TABLE IV

| Polymerization Time (Hours) | IV (dl/g) |
| --- | --- |
| 2 | 0.596 |
| 4.67 | 0.788 |
| 6.67 | 0.891 |

This example shows that porous pills having an average weight of only about 0.014 g can be made utilizing commercial compaction/granulation equipment and that such porous pills can be solid state polymerized at a very fast rate. In fact, the polyester prepolymer was solid state polymerized from an IV of less than 0.3 dl/g to an IV of greater than 0.7 in less than 5 hours at a rate of greater than 0.1 dl/g per hour. The polyester prepolymer was solid state polymerized to an IV of greater than 0.8 dl/g in less than 7 hours at a rate of greater than 0.09 dl/g per hour.

EXAMPLE 9

The procedure described in Example 7 was utilized in this experiment except that the porous pills were granulated to a somewhat smaller average size (all of the porous pills dropped through a 4 mesh screen and were caught by a 12 mesh screen) The polyethylene terephthalate prepolymer used in making the porous pills also had a higher IV (0.344 dl/g) than the prepolymer used in Example 7. The IV of the polyester resin made was determined after the approximate polymerization times reported in Table V.

TABLE V

| Polymerization Time (Hours) | IV (dl/g) |
| --- | --- |
| 4 | 0.917 |
| 8 | 1.178 |
| 12 | 1.256 |
| 16 | 1.384 |
| 20 | 1.500 |

This example shows that porous pills made by compaction/granulation systems can be solid state polymerized to IV's of greater than 1.0 dl/g in less than 8 hours. It also shows that such high molecular weight resins having IV's of 1.5 dl/g can be made utilizing such porous pills.

EXAMPLE 10

Polyethylene terephthalate having an IV of 0.238 dl/g was synthesized utilizing a conventional melt polymerization technique and was ground to a powder having a particle size of 80 mesh (less than 177 microns).

The powder was then made into porous pills utilizing a commercial pellet mill system (California pellet mill). The porous pills made were in the form of cylinders which were 0.125 inch (0.316 cm) in diameter and an average of 0.25 inch (0.635 cm) long.

The porous pills made by compaction in the pellet mill were then placed in the laboratory size solid state polymerization reactor described in Example 1 which was heated to a temperature of 180° C. for a drying period of about one hour. The prepolymer was then solid state polymerized at a temperature of 235° C. at a constant nitrogen flow rate of 12 standard cubic feet (0.35 m$^3$) per hour. The IV of the polyethylene terephthalate was determined after the approximate solid state polymerization times reported in Table VI.

TABLE VI

| Polymerization Time (Hours) | IV (dl/g) |
| --- | --- |
| 2 | 0.584 |
| 3.5 | 0.693 |

This example shows that the satisfactory porous pills can be made using a commercial pellet mill system. It also shows that such porous pills can be solid state polymerized at a very fast rate.

Variations in the present invention are possible in light of the description of it provided herein. It is, therefore, to be understood that changes can be made in the particular embodiments described which will be within the full intended scope of the invention as defined by the following appended claims.

What is claimed is:

1. In a process for solid state polymerizing a polyester prepolymer into a high molecular weight polyester resin at an elevated temperature, the improvement which comprises utilizing a polyester prepolymer which is in the form of porous pills, wherein the porous pills were made by compacting a powder or the polyester prepolymer having a particle size of less than about 841 microns; wherein the elevated temperature is within the range of about 50? C. below the sticking temperature of the polyester prepolymer up to but not including the sticking temperature of the polyester prepolymer.

2. An improved process for solid state polymerizing a polyester prepolymer into a high molecular weight polyester resin comprising heating the polyester prepolymer to a temperature of from about 1? C. to about 50? C. below its sticking temperature, wherein the polyester prepolymer is in the form of porous pills, wherein said porous pills were made by agglomerating a powder of the polyester prepolymer having a particle size of less than about 841 microns.

3. A porous pill which can be solid state polymerized at a very rapid rate into a high molecular weight polyester resin wherein said porous pill is comprised of a polyester prepolymer having an intrinsic viscosity of at least about 0.1 dl/g in a 60:40 phenol:tetrachloroethane solvent system at a temperature of 30? C. and at a concentration of 0.4 g/dl; wherein said porous pill contains a substantial volume of interstice which penetrates the porous pill and open to the outside; wherein the porous pill has a density which is within the range of about 70% to about 99% of the density of solid polyester pellets which are comprised of the same polyester prepolymer; and wherein the porous pill is made by compacting a power of the polyester having a particle size of less than about 841 microns.

4. A porous pill as specified in claim 3 wherein said compacting is done by utilizing a compaction/granulation system.

5. A porous pill as specified in claim 3 wherein said compacting is done by utilizing extrusion equipment.

6. A porous pill as specified in claim 3 wherein said porous pill is made by compaction in a pellet mill system.

7. A process as specified in claim 1 wherein the porous pill is made utilizing a compaction/granulation system.

8. A process as specified in claim 1 wherein the porous pill is made utilizing a pellet mill.

9. A porous pill as specified in claim 3, wherein said powder has a particle size of less than about 420 microns.

10. A porous pill as specified in claim 3, wherein said powder has a particle size of less than about 250 microns.

11. A porous pill as specified in claim 3, wherein said polyester prepolymer is polyethylene terephthalate.

12. A porous pill as specified in claim 3, wherein said polyethylene terephthalate has an intrinsic viscosity of about 0.18 to about 0.29 dl/g.

13. A porous pill as specified in claim 3, wherein said polyethylene terephthalate has an intrinsic viscosity of about 0.2 to about 0.28 dl/g.

14. A process as specified in claim 1 wherein the polyester prepolymer is polyethylene terephthalate.

15. A process as specified in claim 4 wherein said elevated temperature is within the range of about 210° C. to about 255° C.

16. A process as specified in claim 14 wherein said elevated temperature is within the range of about 230° C. to about 250° C.

17. A process as specified in claim 7 wherein the polyester prepolymer is polyethylene terephthalate; wherein the elevated temperature is within the range of about 210° C. to about 255° C.; and wherein said polymerization is carried out in the presence of at least one inert gas.

18. A process as specified in claim 1 wherein said solid state polymerization is conducted in a static bed reactor wherein the porous pills move from the top to the bottom of the reactor by reason of the force of gravity in a partially dammed state.

19. A porous pill as specified in claim 3 wherein said porous pill has a density which is within the range of about 70% to about 96%.

20. A porous pill as specified in claim 3 wherein said porous pill has a density which is within the range of about 85% to about 93%.

21. A process as specified in claim 1 wherein the porous pills are made utilizing extrusion equipment.

22. A porous pill as specified in claim 3 wherein said compaction is done by utilizing a briquetting system.

23. A process as specified in claim 1 wherein the porous pill is made utilizing a briquetting system.

24. A porous pill which can be solid state polymerized at a very rapid rate into a high molecular weight polyester resin wherein said porous pill is comprised of a polyester prepolymer having an intrinsic viscosity of at least about 0.1 dl/g in a 60:40 phenol:tetrachloroethane solvent system at a temperature of 30° C. and at a concentration of 0.4 g/dl; wherein said porous pill contains a substantial volume of interstices which penetrates the porous pill and open to the outside; wherein the porous pill has a density which is within the range of about 70% to about 99% of the density of solid polyester pellets which are comprised of the same polyester prepolymer; and wherein the porous pill is made by agglomerating a powder of the polyester prepolymer having a particle size of less than about 841 microns.

* * * * *